US008336585B2

(12) United States Patent
Royce

(10) Patent No.: US 8,336,585 B2

(45) Date of Patent: Dec. 25, 2012

(54) CONCRETE FUNNEL AND PLACEMENT SYSTEM

(75) Inventor: Trevor Royce, Anderson, MO (US)

(73) Assignee: Royce Innovations, LLC, Anderson, MO (US)

( * ) Notice: Subject to any disclaimer, the term of this patent is extended or adjusted under 35 U.S.C. 154(b) by 739 days.

(21) Appl. No.: 12/402,902

(22) Filed: Mar. 12, 2009

(65) Prior Publication Data

US 2009/0229707 A1 Sep. 17, 2009

Related U.S. Application Data

(63) Continuation-in-part of application No. 12/047,898, filed on Mar. 13, 2008.

(51) Int. Cl.

| | |
|---|---|
| ***B65B 39/00*** | (2006.01) |
| ***B67C 11/04*** | (2006.01) |
| ***B65G 11/00*** | (2006.01) |
| ***B67D 7/78*** | (2010.01) |

(52) U.S. Cl. ............ 141/332; 141/331; 141/340; 193/4; 193/15; 193/16; 222/145.4

(58) Field of Classification Search .................. 141/331, 141/332, 333, 340; 193/4, 5, 10, 15, 16, 193/22; 222/145.4, 214; 366/68

See application file for complete search history.

(56) References Cited

U.S. PATENT DOCUMENTS

| | | | | |
|---|---|---|---|---|
| 679,399 A | | 7/1901 | Smith et al. | |
| 1,702,102 A | | 2/1929 | Beckwith | |
| 1,702,224 A | | 2/1929 | Webb | |
| 2,050,774 A | * | 8/1936 | Wilcox | 193/4 |
| 3,072,371 A | | 1/1963 | Doyle | |
| 3,232,460 A | | 2/1966 | Rouse | |
| 3,249,192 A | * | 5/1966 | Buskirk | 193/4 |
| 3,310,293 A | | 3/1967 | Zimmerman | |
| 3,334,872 A | * | 8/1967 | Hansen et al. | 366/68 |

(Continued)

FOREIGN PATENT DOCUMENTS

FR 2899215 10/2007

(Continued)

*Primary Examiner* — Len Tran

*Assistant Examiner* — Ryan Reis

(74) *Attorney, Agent, or Firm* — Head, Johnson & Kachigian, P.C.

(57) ABSTRACT

A concrete funnel and placement system comprising a funnel-type apparatus removably securable to a concrete chute having a retainer element coupled to a funnel element. The funnel element includes a downwardly sloping base forming an aperture for concrete to flow through. The aperture may be any shape or size, and one or more interchangeable discharge plates may be included in order to selectively change the shape and/or size of the aperture. Further, the aperture of the funnel element may be selectively opened or closed. Bearings, sprockets, rollers or other rotatable mechanisms may be included to allow the funnel element to rotate 360° with respect to the retainer element. The retainer element may include a gasket forming a seal with the funnel element to prevent concrete from impeding rotation. The retainer element may be hingedly secured to the concrete chute allowing the retainer element to be adjusted such that it is substantially horizontal while pouring concrete, independent of the angle of the concrete chute. The funnel-type apparatus may be in communication with the concrete truck, thus allowing the rotation and adjustment of the funnel-type apparatus to be controlled by electronics, such that the operator may be located in the cab of the truck or other location.

20 Claims, 9 Drawing Sheets

U.S. PATENT DOCUMENTS

| | | | | | |
|---|---|---|---|---|---|
| 3,367,636 | A | * | 2/1968 | Duecy | 366/49 |
| 3,633,879 | A | * | 1/1972 | Prichard | 366/68 |
| 3,705,710 | A | * | 12/1972 | Mueller | 366/11 |
| 3,746,140 | A | * | 7/1973 | Schiffelbein | 193/5 |
| 3,768,784 | A | | 10/1973 | Spellman, Jr. | |
| 3,871,628 | A | | 3/1975 | Pulk et al. | |
| 4,007,821 | A | | 2/1977 | Schiffelbien | |
| 4,047,604 | A | | 9/1977 | Daoust et al. | |
| 4,441,821 | A | | 4/1984 | Burkhart et al. | |
| 4,551,024 | A | | 11/1985 | Clapp | |
| 4,688,667 | A | | 8/1987 | Peterson | |
| 4,768,884 | A | | 9/1988 | Elkin | |
| 5,354,127 | A | | 10/1994 | Del Zotto et al. | |
| 5,433,520 | A | | 7/1995 | Adams et al. | |
| 5,531,518 | A | | 7/1996 | Alves | |
| 5,732,753 | A | | 3/1998 | Danzi et al. | |
| 5,950,934 | A | | 9/1999 | Podesta et al. | |
| 6,007,233 | A | | 12/1999 | Cairns | |
| 6,076,710 | A | | 6/2000 | Yates et al. | |
| 6,106,141 | A | | 8/2000 | Brunn | |
| 6,155,277 | A | * | 12/2000 | Barry | 134/104.4 |
| 6,782,925 | B2 | * | 8/2004 | Raposo et al. | 141/5 |

FOREIGN PATENT DOCUMENTS

| | | |
|---|---|---|
| SU | 679399 | 8/1979 |
| WO | WO9316254 | 8/1993 |

* cited by examiner

FIG. 1
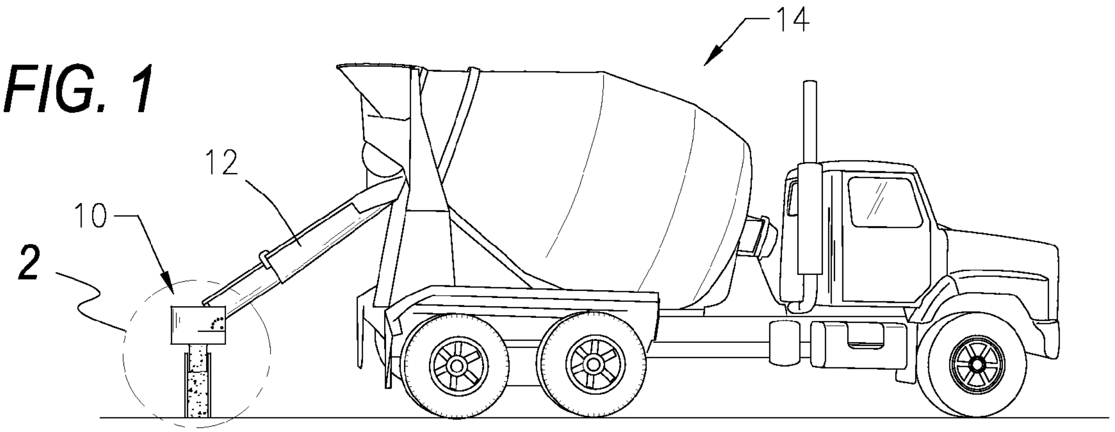
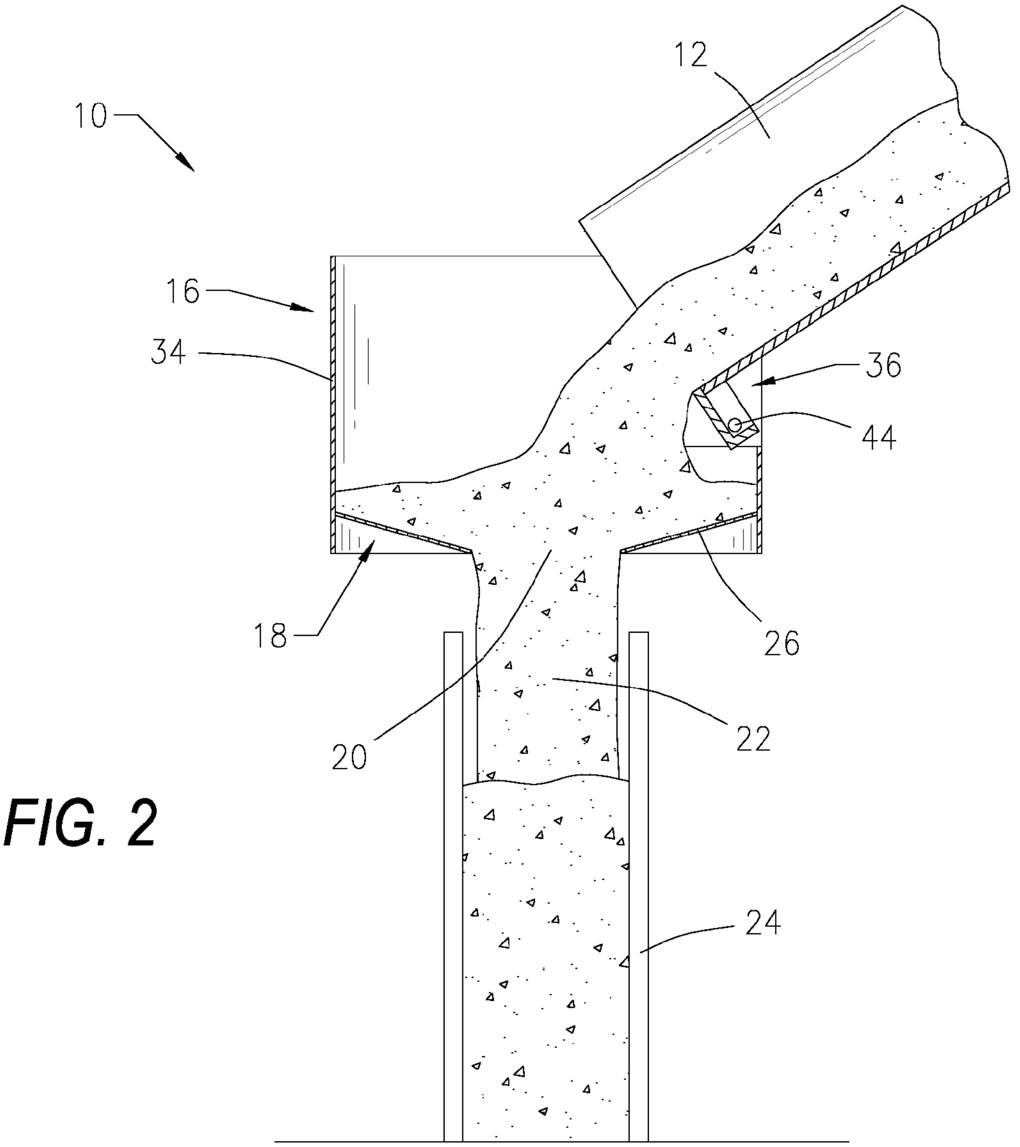
FIG. 2

CONCRETE FUNNEL AND PLACEMENT SYSTEM

CROSS-REFERENCE TO RELATED APPLICATIONS

This application claims priority to and is a continuation-in-part of U.S. application Ser. No. 12/047,898, filed Mar. 13, 2008, which is incorporated herein by reference.

BACKGROUND OF THE INVENTION

1. Field of the Invention

This invention relates generally to a concrete funnel and placement system, and more particularly to a funnel-type apparatus removably securable to a concrete chute comprising a retainer element coupled to a funnel element having an aperture for directing the flow of concrete to a desired location.

2. Description of the Related Art

It is common practice to make concrete in a transit-mixer truck during transit from a supply station to a worksite and to dispense the mixed slurry of concrete by means of an elongate, rigid, upwardly opening U-shaped metal concrete chute having a receiver end related to the discharge end of a mixing drum rotatably mounted relative to the transit-mixture truck and a discharge end which is adapted to be arranged upwardly from the situs of the item onto or into which the slurry is to be deposited. The receiver end of the concrete chute is typically mounted adjacent to the mixing drum so that it can be swung or pivoted in a horizontal plane as circumstances require. Further, ordinary concrete chutes are mounted so as to provide for the horizontal and/or vertical adjustments of its discharge end.

These ordinary concrete chutes are often inconvenient and difficult to use, especially if the concrete is intended for deposit in a narrow or irregularly-shaped form or in a form where the dimensions are exceptionally small. Typical of the confined spaces are footings, wall forms, masonry block cells, wall framings, casting molds or other confined spaces. While these forms are very useful, they are difficult to make. The tight space confines in these and other closely confined areas lead to great difficulties while pouring concrete.

An advantage of the funnel-type apparatus is that it can be secured to a variety of different types of chutes. In this fashion, the funnel-type apparatus can be moved from one concrete chute to another without the necessity of having a plurality of funnel-type apparatus in stock.

It is therefore desirable to provide a concrete funnel and placement system having a funnel-type apparatus removably securable to a concrete chute that efficiently and effectively directs the flow of concrete from the concrete chute in order to minimize or avoid waste and clean up.

It is further desirable to provide a funnel-type apparatus removably securable to a concrete chute which avoids wasting material and assists in the directing of the material flow.

It is still further desirable to provide a funnel-type apparatus removably securable to a concrete chute for directing the flow of concrete from a concrete chute of a concrete mixer.

It is yet further desirable to provide a funnel-type apparatus removably securable to a concrete chute that permits filling of masonry block walls.

It is yet further desirable to provide a funnel-type apparatus removably securable to a concrete chute that permits the filling of confined spaces with concrete.

It is yet further desirable to provide a funnel-type apparatus removably securable to a concrete chute that may be fitted to a variety of concrete chutes.

SUMMARY OF THE INVENTION

In general, in a first aspect, the invention relates to a concrete funnel and placement system comprising a funnel-type apparatus removably securable to a concrete chute. The funnel-type apparatus includes a retainer element rotatably coupled to a funnel element. The retainer element has a lower section, an upstanding sidewall and a receiving section. The lower section of the retainer element is rotatably coupled to the funnel element, and the receiving section of the retainer element is removably securable to the concrete chute. The funnel element has a downwardly sloping base with an aperture through which concrete flows to a desired point. The funnel element and the lower section of the retainer element may be substantially annular.

The retainer element is rotatably coupled to the funnel element via a bearing assembly. The bearing assembly may include an inner bearing block secured to the upstanding sidewall of the retainer element, an outer bearing block secured to the funnel element, and a plurality of bearings rotatably positioned intermediate of the inner bearing block and the outer bearing block. The inner bearing block may include at least one grease channel and at least one grease port for providing a means of greasing the plurality of bearings. Alternatively, the bearing assembly may include the retainer element having a collar with a plurality of bearings rotatably coupled to a lip of the funnel element. The bearing assembly could rather include a lever lock ring having a plurality of bearings rotatably coupling the retainer element to a lip of the funnel element. In addition, the funnel-type apparatus may include a gasket intermediate of the retainer element and the funnel element.

The upstanding sidewall of the retainer element of the concrete funnel and placement system can be generally arcuate shaped and have a first terminal end and a second terminal end. The first terminal end and the second terminal end of the upstanding sidewall may include a plurality of adjustment holes circumferentially spaced about a pivot axis, with the pivot axis allowing the funnel-type apparatus to be adjusted independent of the angle of the concrete chute. Further, the adjustment holes are capable of receiving an alignment bolt. Additionally, the first terminal end and the second terminal end of the upstanding sidewall could include a primary hinge hole along the pivot axis to adjustably secure the funnel-type apparatus to the concrete chute.

The concrete funnel and placement system may further include a generally arcuate concrete chute attachment member pivotally connected about the pivot axis to the receiving section of the retainer element. The concrete chute attachment member may have at least one hook for removably attaching the concrete chute attachment member to the concrete chute. Moreover, the concrete funnel and placement system could include a generally arcuate chute adapter removably attachable to the concrete chute attachment member. In addition, the concrete funnel and placement system may have at least one interchangeable discharge plate removably securable to the downwardly sloping base of the funnel element for selectively altering the size or the shape of the aperture of the funnel element.

The size or the shape of the aperture of the funnel element may be selectively adjustable to accurately control the flow of concrete. Further, the funnel element can have at least one handle. The concrete funnel and placement system could include a remote operating mechanism allowing an operator to rotate or adjust the funnel-type apparatus from a cab of a mixer truck or other location. Also, the funnel-type apparatus may be constructed of a light-weight, non-reactive polymer, plastic or metal.

In general, in a second aspect, the invention relates to a concrete funnel and placement system having a retainer element comprising a substantially annular lower section, a generally arcuate upstanding sidewall and a receiving section, with the receiving section of the retainer element being removably securable to a concrete chute. The retainer element has a pivot axis allowing the system to be adjusted independent of the angle of the concrete chute. The upstanding sidewall of the retainer element has a first terminal end and a second terminal end, each having a plurality of adjustment holes circumferentially spaced about the pivot axis. The adjustment holes are capable of receiving an alignment pin to fix the angle of the retainer element with regard to the concrete chute. The concrete funnel and placement system also has a substantially annular funnel element comprising a downwardly sloping base having an aperture through a center portion thereof from which concrete flows to a desired point. The funnel element is rotatably coupled to the lower section of the retainer element via a bearing assembly. Also, the funnel element has at least one handle. In addition, the concrete funnel and placement system includes at least one interchangeable discharge plate removably securable to the downwardly sloping base of the funnel element for selectively altering the size or the shape of the aperture of the funnel element.

The bearing assembly may include an inner bearing block secured to the lower section of the retainer element, an outer bearing block secured to the funnel element, and a plurality of bearings rotatably positioned intermediate of the inner bearing block and the outer bearing block. The inner bearing block includes at least one grease channel and at least one grease port for providing a means of lubricating the bearings in the bearing channel. The bearing assembly may alternatively be constructed by the retainer element having a collar with a plurality of bearings rotatably coupled to a lip of the funnel element. The bearing assembly could rather include a lever lock ring having a plurality of bearings rotatably coupling the retainer element to a lip of the funnel element.

The concrete funnel and placement system may include a generally arcuate concrete chute attachment member pivotally connected about the pivot axis to the receiving section of the retainer element. The concrete chute attachment member may include at least one hook for removably attaching the concrete chute attachment member to the concrete chute. A generally arcuate chute adapter may also be provided and be removably attachable to the concrete chute attachment member.

BRIEF DESCRIPTION OF THE DRAWINGS

FIG. 1 is a perspective view of an example of a funnel-type apparatus removably secured to a concrete chute of a mixer truck;

FIG. 2 is an exploded view of area 2 of the funnel-type apparatus removably secured to the concrete chute as shown in FIG. 1;

Figure 3:
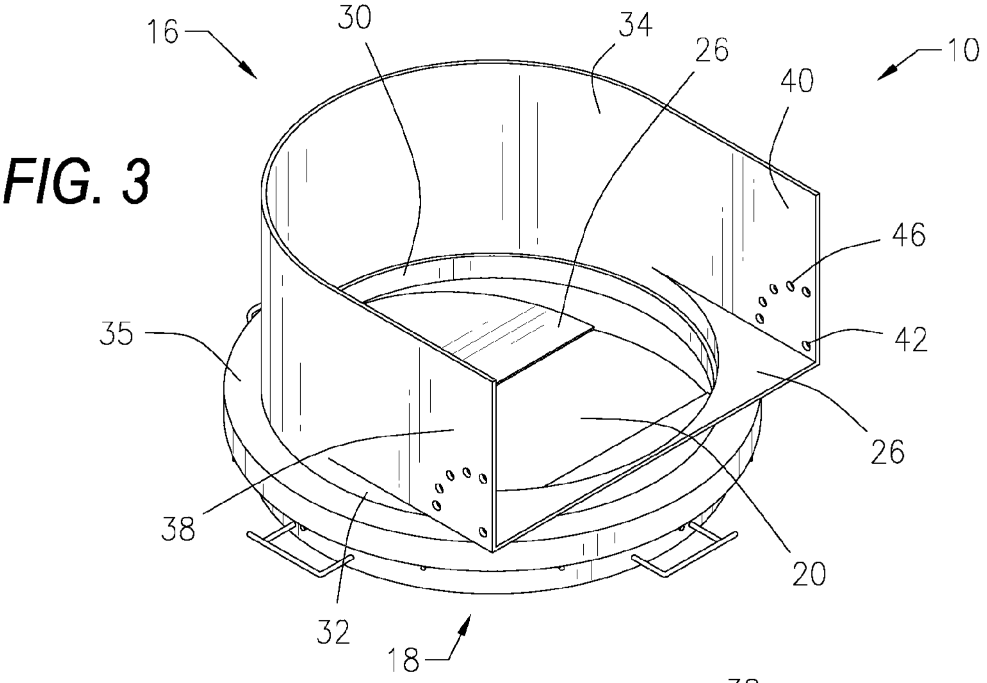
FIG. 3 is a perspective view of an example of a funnel-type apparatus removably securable to a concrete chute in accordance with an illustrative embodiment of the concrete funnel and placement system disclosed herein.
Figure 4:
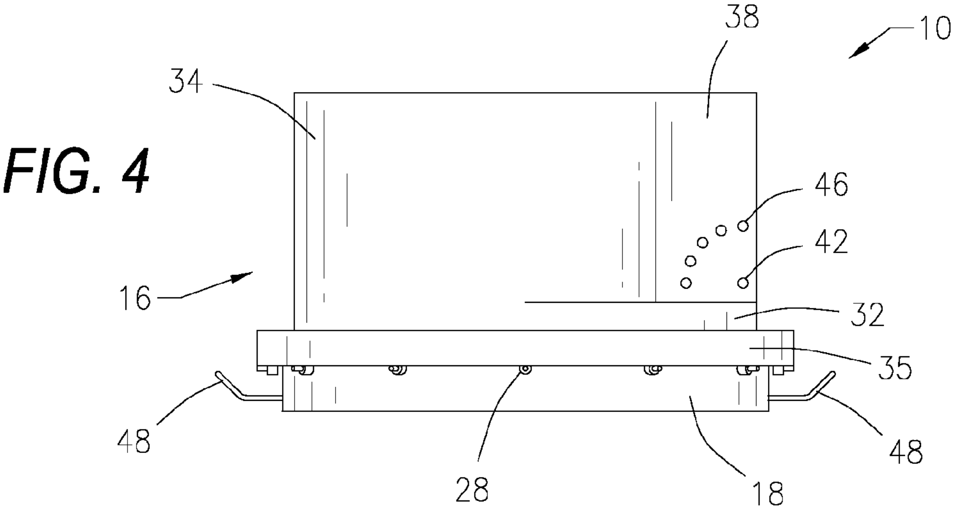
FIG. 4 is a side perspective view of an example of a funnel-type apparatus removably securable to a concrete chute in accordance with an illustrative embodiment of the concrete funnel and placement system disclosed herein.
Figure 5:
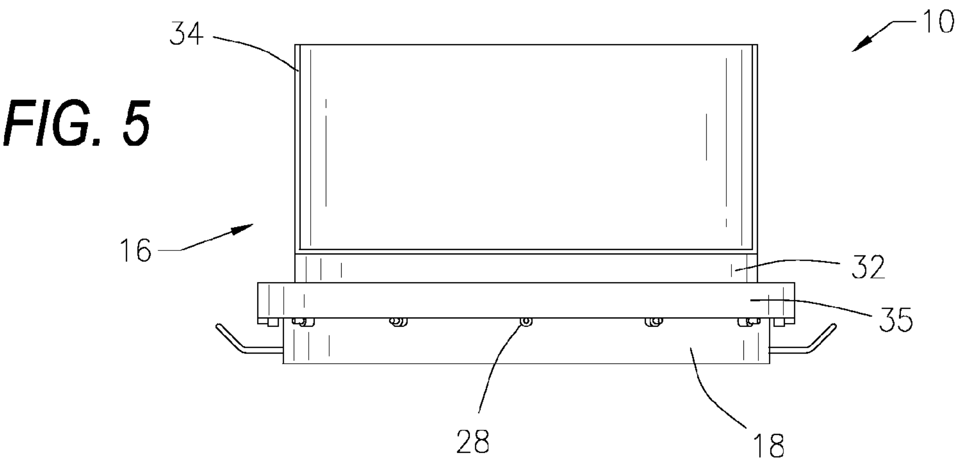
FIG. 5 is a front perspective view of an example of a funnel-type apparatus removably securable to a concrete chute in accordance with an illustrative embodiment of the concrete funnel and placement system disclosed herein.
Figure 6:
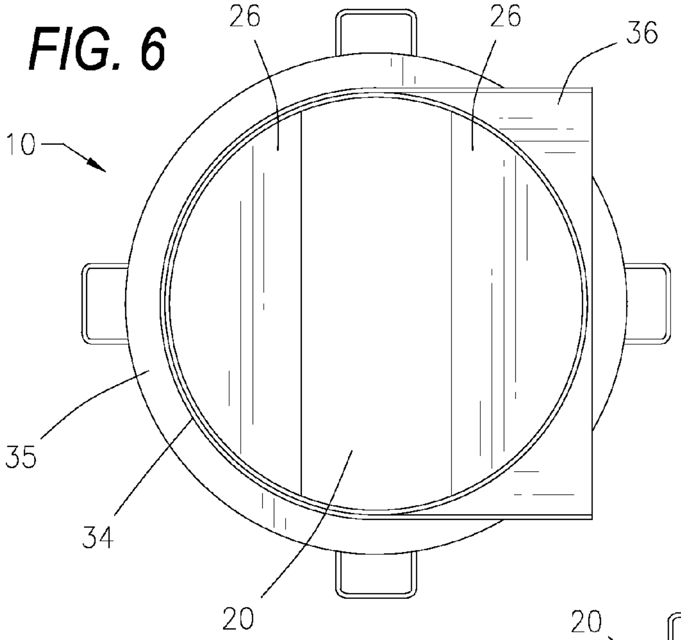
FIG. 6 is a top perspective view of an example of a funnel-type apparatus removably securable to a concrete chute in accordance with an illustrative embodiment of the concrete funnel and placement system disclosed herein.
Figure 7:
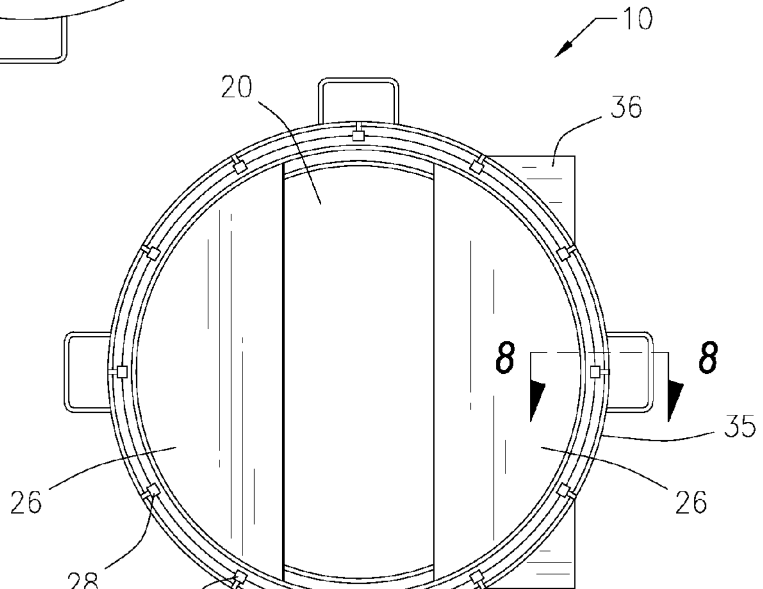
FIG. 7 is a bottom perspective view of an example of a funnel-type apparatus removably securable to a concrete chute in accordance with an illustrative embodiment of the concrete funnel and placement system disclosed herein.
Figure 8:
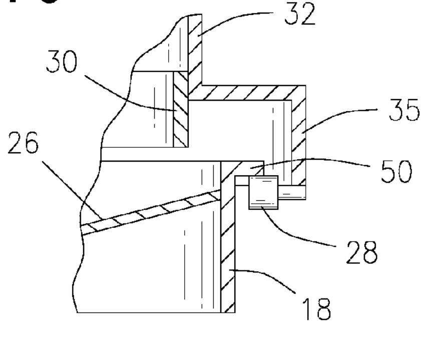
FIG. 8 is a cross-section view along line 8-8 of the funnel-type apparatus removably securable to a concrete chute shown in FIG. 7.
Figure 9:
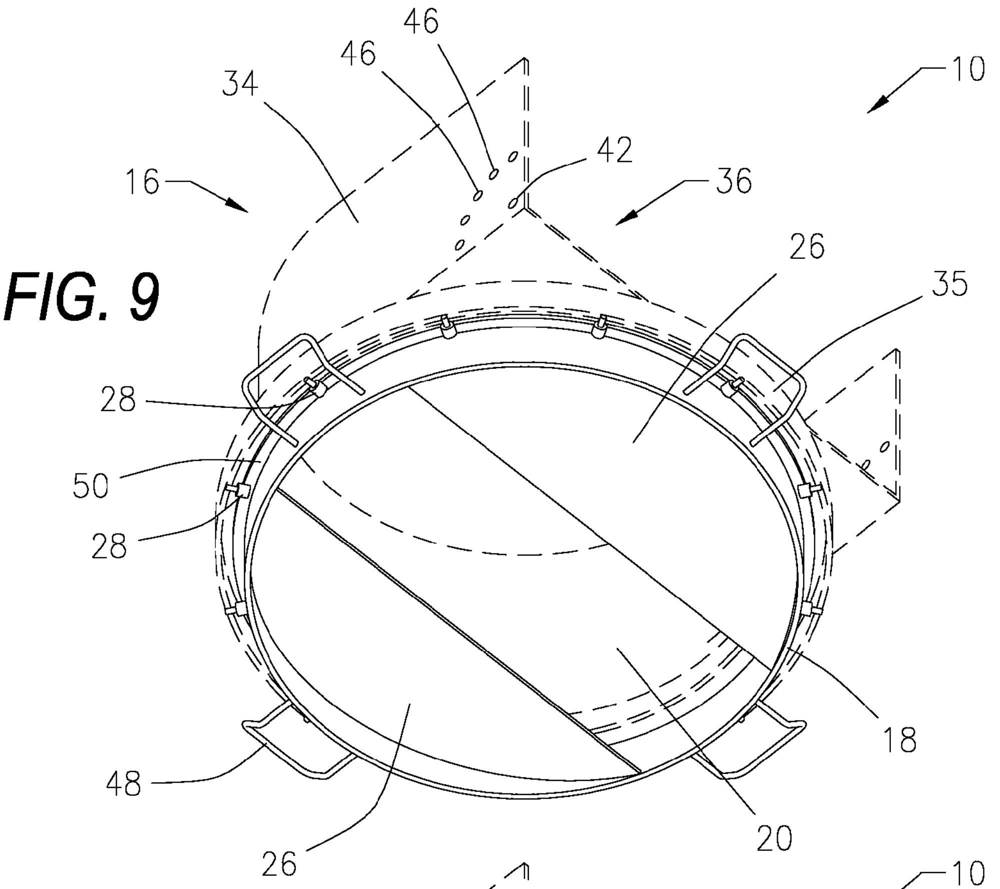
FIG. 9 is a schematic bottom view of an example of a funnel-type apparatus removably securable to a concrete chute in accordance with an illustrative embodiment of the concrete funnel and placement system disclosed herein.
Figure 10:
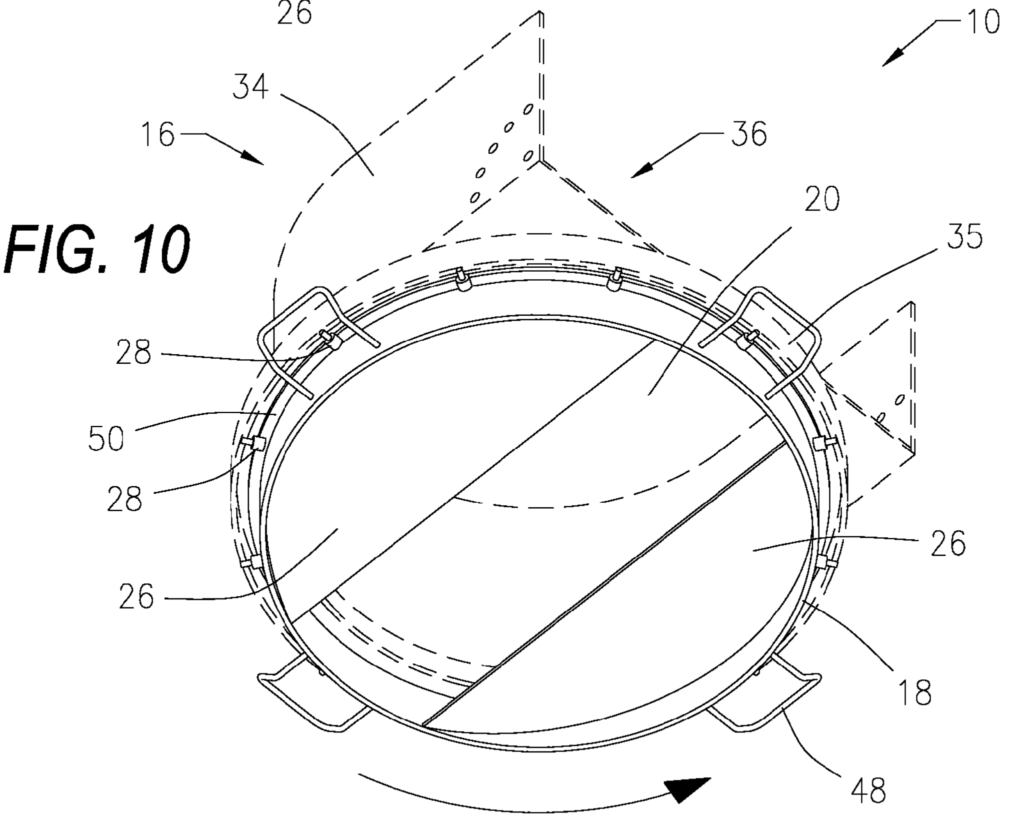
FIG. 10 is another schematic bottom view of an example of a funnel-type apparatus removably securable to a concrete chute in accordance with an illustrative embodiment of the concrete funnel and placement system disclosed herein.
Figure 11:
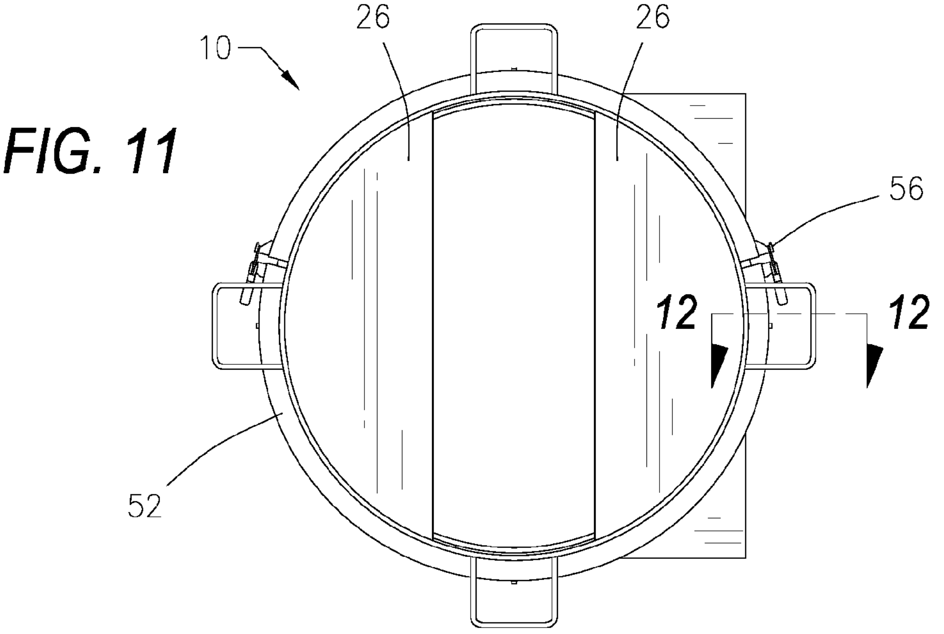
FIG. 11 is a top perspective view of another example of a funnel-type apparatus removably securable to a concrete chute in accordance with an illustrative embodiment of the concrete funnel and placement system disclosed herein.
Figure 12:
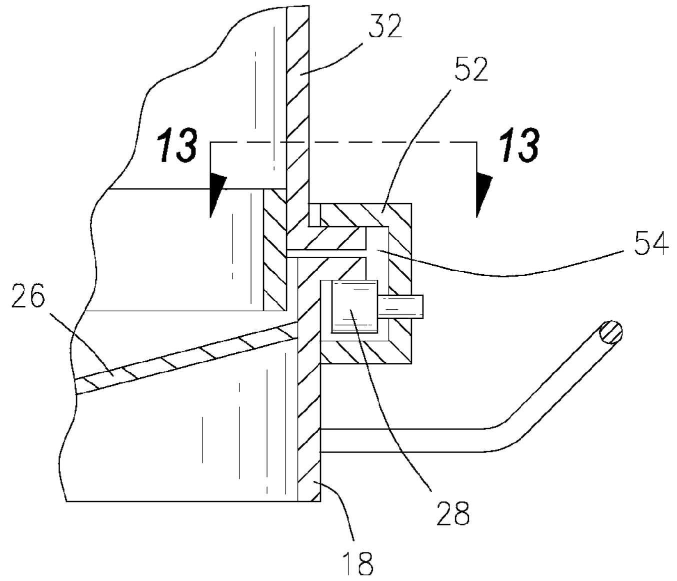
FIG. 12 is a cross-section view along line 12-12 of the funnel-type apparatus removably securable to a concrete chute shown in FIG. 11.
Figure 13:
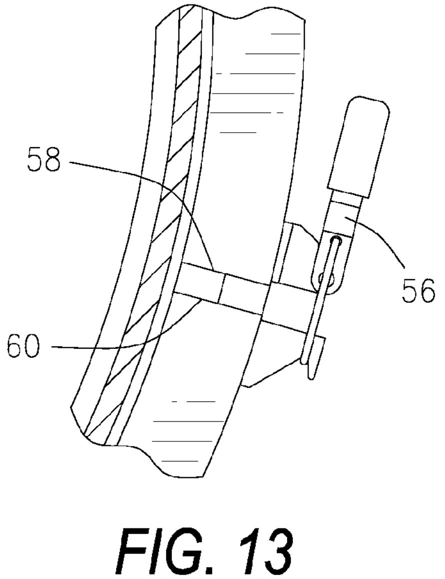
FIG. 13 is a cross-section view along line 13-13 of the funnel-type apparatus removably securable to a concrete chute shown in FIG. 12.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

Referring to the figures of the drawings, wherein like numerals of reference designate like elements throughout the several views, and initially to FIG. 1, a concrete placement and funnel system comprising a funnel-type apparatus 10 removably secured to a concrete chute 12 on the rear end of a mixer truck 14. Existing concrete chutes 12 may be retrofitted or utilized with the funnel-type apparatus 10 or a specially designed concrete chute 12 may be utilized. The specially designed concrete chute 12 may replace the last segment in existing concrete chutes. The specially designed concrete chute 12 may include hinge holes for receipt of a hinge bar 44. The specially designed concrete chute 12 may further include alignment holes for receipt of an alignment bolt (not shown). The specially designed concrete chute's 12 hinge holes and alignment holes allow the funnel-type apparatus 10 to be leveled and oriented for a particular job. For purposes of illustration, the funnel-type apparatus 10 is shown removably secured to a rear discharge mixing truck 14; however, the funnel-type apparatus 10 disclosed herein should not be so limited. Those skilled in the art will appreciate that the funnel-type apparatus 10 may be used on front discharge mixing trucks, portable concrete mixers or any other concrete mixing/delivery devices. The funnel-type apparatus 10 includes a retainer element 16 coupled to a funnel element 18. The funnel element 18 has a base 26, which slopes downwardly and forms an aperture 20 for directing the flow of concrete 22 to a desired location, as shown in FIGS. 1 and 2 as a retaining or masonry wall 24. The base 26 should have sufficient rigidity to withstand the weight of the concrete 22. The retainer element 16 may be coupled to the funnel element 18 to form a unitary funnel-type apparatus 10.

Referring now to FIGS. 3 through 10, the funnel-type apparatus 10 is removably securable to the concrete chute 12 and includes the retainer element 16 coupled to the funnel element 18. The funnel element 18 includes a downwardly sloping base 26 forming the aperture 20 for concrete 22 to flow through. The aperture 20 may be any size or shape to fit the particulars of a specific job. The size and shape of the aperture 20 may be adjusted in order to accurately control the flow of the concrete 22. The downwardly sloping base 26 having the aperture 20 formed therein may be exchangeable or replaceable with bases having different shaped, sized and/or patterned apertures.

The retainer element 16 of the funnel-type apparatus 10 includes a sidewall 34 and a receiving section 36 for receipt of the concrete chute 12. The sidewall 34 may be generally U-shaped and may include a first terminal end 38 and a second terminal end 40. The first and second terminal ends 38 and 40 of the sidewall 34 may include a primary hinge hole 42 for receipt of a hinge bar 44 to adjustably secure the funnel-type apparatus 10 to the concrete chute 12. The primary hinge hole 42 and hinge bar 44 allow the level and orientation of the funnel-type apparatus 10 to be adjusted independently of the angle of the concrete chute 12, to which the funnel-type apparatus 10 is removably secured. The first and second terminal ends 38 and 40 of the sidewall 34 may further include a plurality of adjustment holes 46 circumferentially spaced from the primary hinge hole 42. The adjustment holes 46 may receive an adjustment bar or pin (not shown) to fix the orientation and level of the funnel-type apparatus 10 once it has been adjusted to suit the particular job.

The retainer element 16 may be hingedly secured to the concrete chute 12 allowing the retainer element 16 to be adjusted such that it is substantially horizontal while pouring concrete, independent of the angle of the concrete chute 12. The funnel-type apparatus 10 may be in communication with the mixer truck 14, thus allowing the rotation and adjustment of the funnel-type apparatus 10 to be controlled by electronics, such that the operator may be located in the cab of the mixer truck or other location.

The retainer element 16 may be rotatably coupled to the funnel element 18. When rotatably coupled to the retainer element 16, the funnel element 18 is capable of rotating 360° with respect to the retainer element 16. This rotation may be locked by the operator to prevent the funnel element 18 from inadvertently rotating during operation. The retainer element 16 may include a gasket 30 forming a seal with the funnel element 18 to prevent concrete 22 from impeding rotation.

The lower section 32 of retainer element 16 may be substantially annular and may include a collar 35. Collar 35 of the retainer element 16 may include a plurality of bearings 28 or other rotating support. The funnel element 18 may be substantially annular and include a lip 50. The lip 50 of the funnel element 18 may be rotatably coupled to the collar 35 of the retainer element 16. The funnel element 18 may also include a handle or knob 48 to aid the operator in rotating the funnel element 18.

The funnel element 18 may be rotatably coupled to the retainer element 16 using a lever lock ring 52. The lever lock ring 52 may be generally U-shaped and have a channel 54 on an interior portion. The lever lock ring 52 relies on a lever-activated mechanism 56 to bring the ends 58 and 60 of the lever lock ring 52 together. The lever lock ring 52 may include a plurality of bearings 28 allowing the funnel element 18 to rotate independently of the retainer element 16. Using of the lever lock ring 52 allows the retainer element 16 and the funnel element 18 of the funnel-type apparatus 10 to be taken apart for ease of cleaning and maintenance between uses.

The funnel-type apparatus 10 may be constructed of any light-weight, non-reactive and structurally resilient materials, including but not limited to a polymer, plastic or metal. The funnel-type apparatus 10 may also be constructed in varying sizes and shapes according to the type of mixer truck 14 or concrete chute 12 to which it is removably secured. The funnel-type apparatus 10 may also be remotely controlled allowing the operator to adjust the level and orientation, along with rotating the funnel element 18, from the cab of the mixer truck or other location.

Figure 14A:
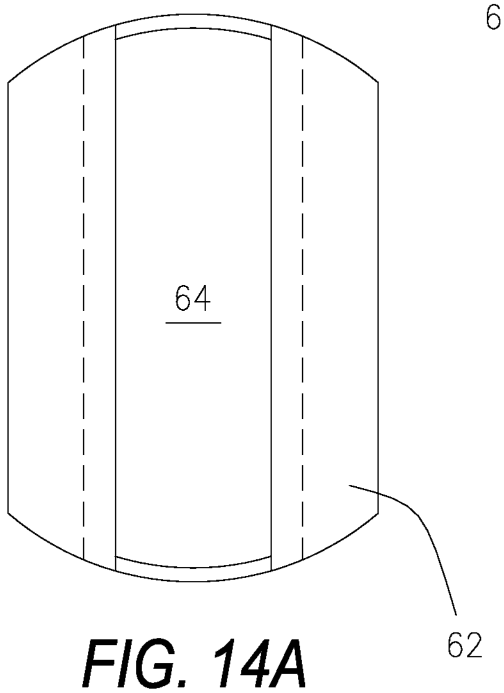
FIGS. 14*a* through 14*d* are top perspective view of examples of interchangeable discharge plates in accordance with an illustrative embodiment of the concrete funnel and placement system disclosed herein.
Figure 14B:
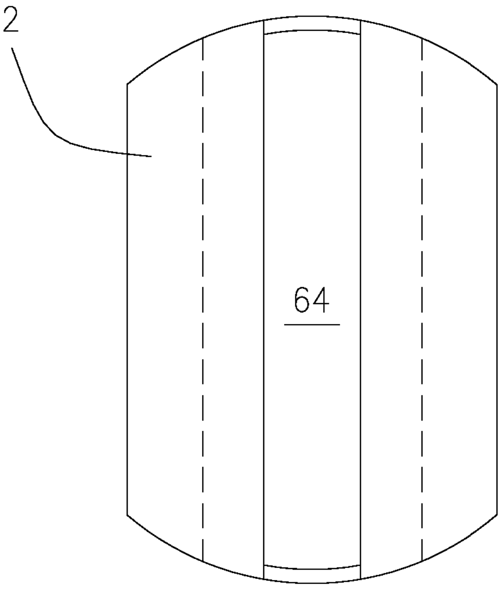
Figure 14C:
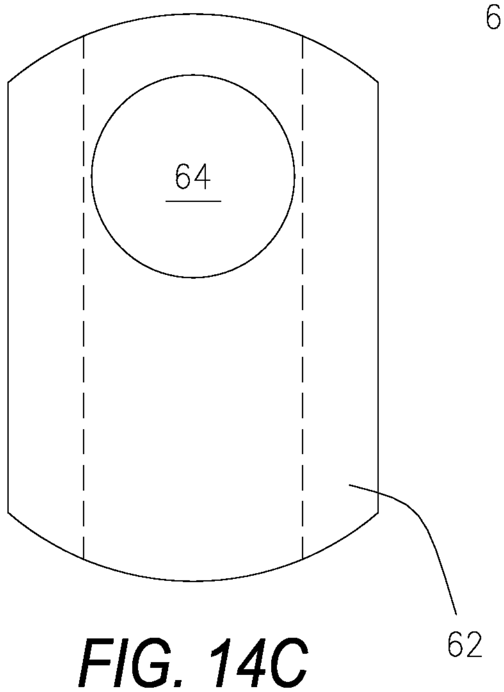
Figure 14D:
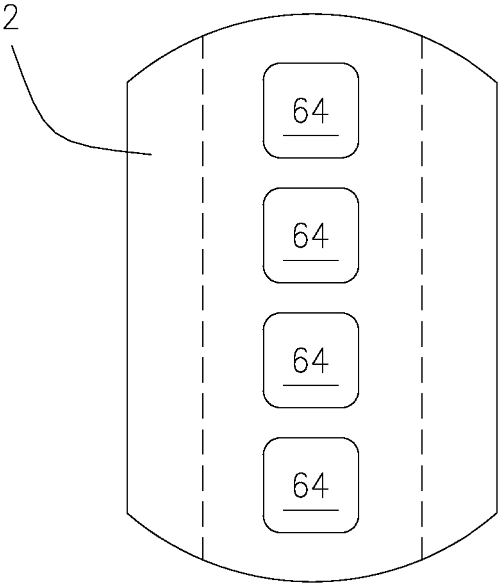

The aperture 20 of the funnel element 18 may be of any size, shape and/or configuration to meet the needs of a particular job. An interchangeable discharge plate 62 may be removably securable to the downwardly sloping base 26 of the funnel element 18 in order to alter the size, shape and/or configuration of the aperture 20 through which the concrete flows to the desired location. For example, the interchangeable discharge plate 62 may include an opening 64 for a 6" wall as illustrated in FIG. 14*a*, an opening 64 for a 4" wall as illustrated in FIG. 14*b*, an opening 64 for an 8" pier/tube as shown in FIG. 14*c* and openings 64 for an 8" block filler as illustrated in FIG. 14*d*. It will be appreciated that a hose (not shown) may be attached to the bottom of the interchangeable discharge plate 62 illustrated in FIG. 14*c* using a hose clamp in order to reduce splatter, such as when pouring walls with insulation in the middle. It will be further appreciated that other interchangeable discharge plates 62 may be utilized having differing shaped, sized and configured openings 64.

Figure 15:
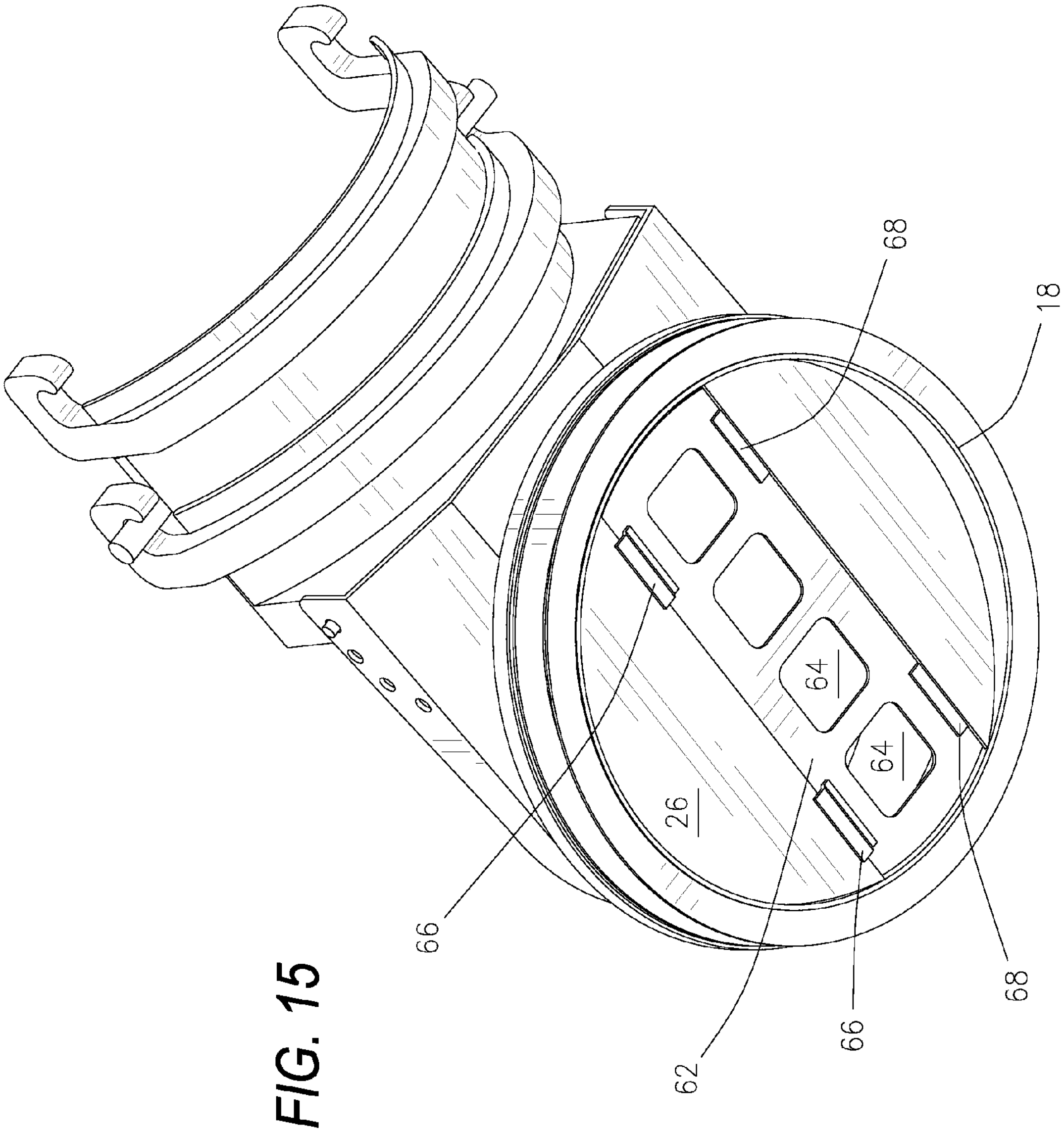
FIG. 15 is a bottom perspective view of an example of the interchangeable discharge plate shown in FIG. 14*d* removably secured to the aperture of the funnel element of the funnel-type apparatus in accordance with an illustrative embodiment of the concrete funnel and placement system disclosed herein.

Turning now to FIG. 15, the interchangeable discharge plate 62 may be removably secured to the downwardly sloping base 26 of the funnel element 18 using two (2) clips 66 secured to the bottom of the interchangeable discharge plate 62. The clips 66 are axially aligned and aligned in parallel with two (2) shoulders 68 secured to the opposing side of the bottom of the interchangeable discharge plate 62. The cooperation between the clips 66 and the shoulders 68 snuggly retain the downwardly sloping base 26 intermediate of the respective clip 66 and the bottom of the interchangeable discharge plate 62. Alternatively, the aperture 20 of the funnel element 18 may be selectively adjustable to accurately control the flow of concrete. For example, a knob may act in cooperation with the downwardly sloping base 26 to selectively open/close the aperture 20 similar to a camera shutter. In either event, when the concrete funnel and placement system is utilized with the interchangeable discharge plate 62 or selectively adjustable aperture 20, the operator must take into account slump and plate size.

Figure 16:
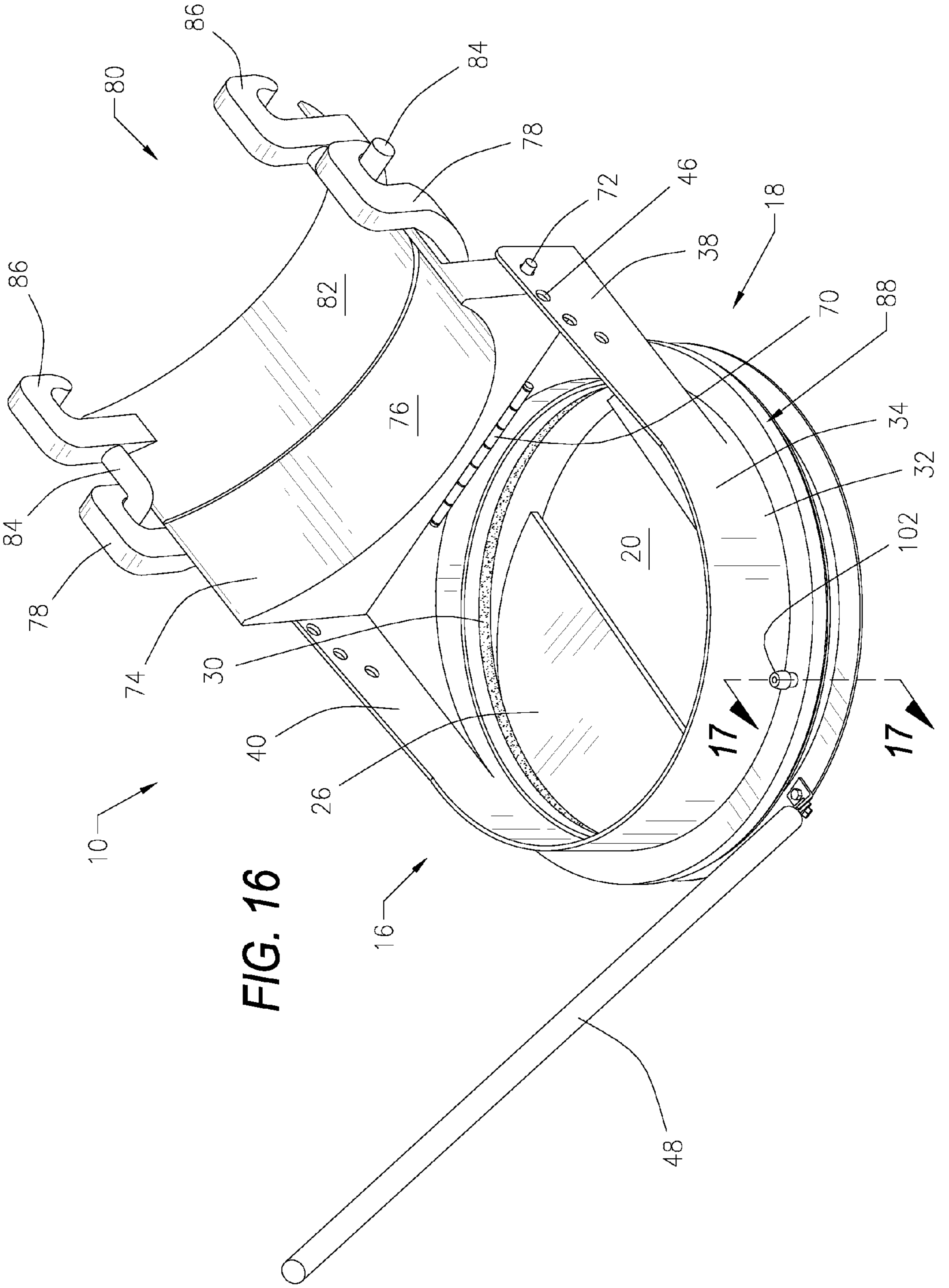
FIG. 16 is a perspective view of another example of a funnel-type apparatus removably securable to a concrete chute in accordance with an illustrative embodiment of the concrete funnel and placement system disclosed herein.

Referring now to FIG. 16, which illustrates another example of the concrete funnel and placement system comprising the funnel-type apparatus 10 having the retainer element 16 rotatably coupled to the substantially annular funnel element 18. The retainer element 16 comprises the substantially annular lower section 32, a generally arcuate upstanding sidewall 34 and a receiving section 36. The receiving section 36 is removably securable to the concrete chute 12 of a mixer truck 14. The substantially annular or U-shaped upstanding sidewall 32 of the retainer element 16 includes a first terminal end 38 and a second terminal end 40. The first and second terminal ends 38 and 40 of the upstanding sidewall 34 may include a plurality of adjustment holes 46 circumferentially spaced about the pivot axis. The adjustment holes 46 may receive an adjustment bar or pin 72 to fix the orientation and level of the funnel-type apparatus 10 once it has been adjusted to suit the particular job. Further, the receiving section 36 may include a downward slope towards the funnel element 18 in order to further assist the flow of concrete from the concrete chute 12 to the desired point.

The funnel element 18 includes a downwardly sloping base 26 forming the aperture 20 for concrete 22 to flow through. As previously discussed, the aperture 20 may be any size or shape to fit the particulars of a specific job or the size and shape of the aperture 20 may be adjusted in order to accurately control the flow of the concrete 22. The downwardly sloping base 26 having the aperture 20 formed therein may be exchangeable or replaceable with bases having different shaped, sized and/or patterned apertures. The funnel element 18 may also include a handle or knob 48 to aid the operator in rotating the funnel element 18 with respect to the retainer element 16 of the funnel-type apparatus 10 of the concrete funnel and placement system disclosed herein. As illustrated in FIG. 16, the handle 48 may be elongated to enable the operator to rotate the funnel element 18 while standing upright during jobs low to the ground.

The concrete funnel and placement system may include a generally arcuate concrete chute attachment member 74 secured to the receiving section 36 of the retainer element 16 using a hinge 70. The hinge 70 is secured between the concrete chute attachment member 74 and the receiving section 36 of the retainer element along a pivot axis allowing the retainer element 16 to be adjusted such that it is substantially horizontal while pouring concrete, independent of the angle of the concrete chute 12. The concrete chute attachment member 74, being arcuate in shape, forms a channel 76 corresponding to the channel of the concrete chute 12. The concrete chute attachment member 74 includes a pair of hooks 78 to enable the concrete chute attachment member 74 to be removably secured to the concrete chute 12.

In addition, the concrete funnel and placement system may include a generally arcuate chute adapter 80 removably attachable to the concrete chute attachment member 74 for jumping from one mixer truck 14 to another. The chute adapter 80 includes a channel 82 corresponding to the channel 76 of the concrete chute attachment member 74 and a pair of opposing pegs 84 for attachment to the hooks 78 of the concrete chute attachment member 74. Also, similarly to the concrete chute attachment member 74, the chute adapter 80 includes a pair of hooks 86 to enable the chute adapter to be removably secured to the concrete chute 12 of the mixer truck 14. It will be appreciated that the chute adapter can come in varying sizes and configurations enabling the funnel-type apparatus 10 of the concrete funnel and placement system to be utilized with varying mixer trucks and concrete chutes. For example, the funnel-type apparatus 10 may be constructed to fit McNeilus mixer trucks and be provided with a chute adapter 80 to fit a KMC mixer truck.

Figure 17:
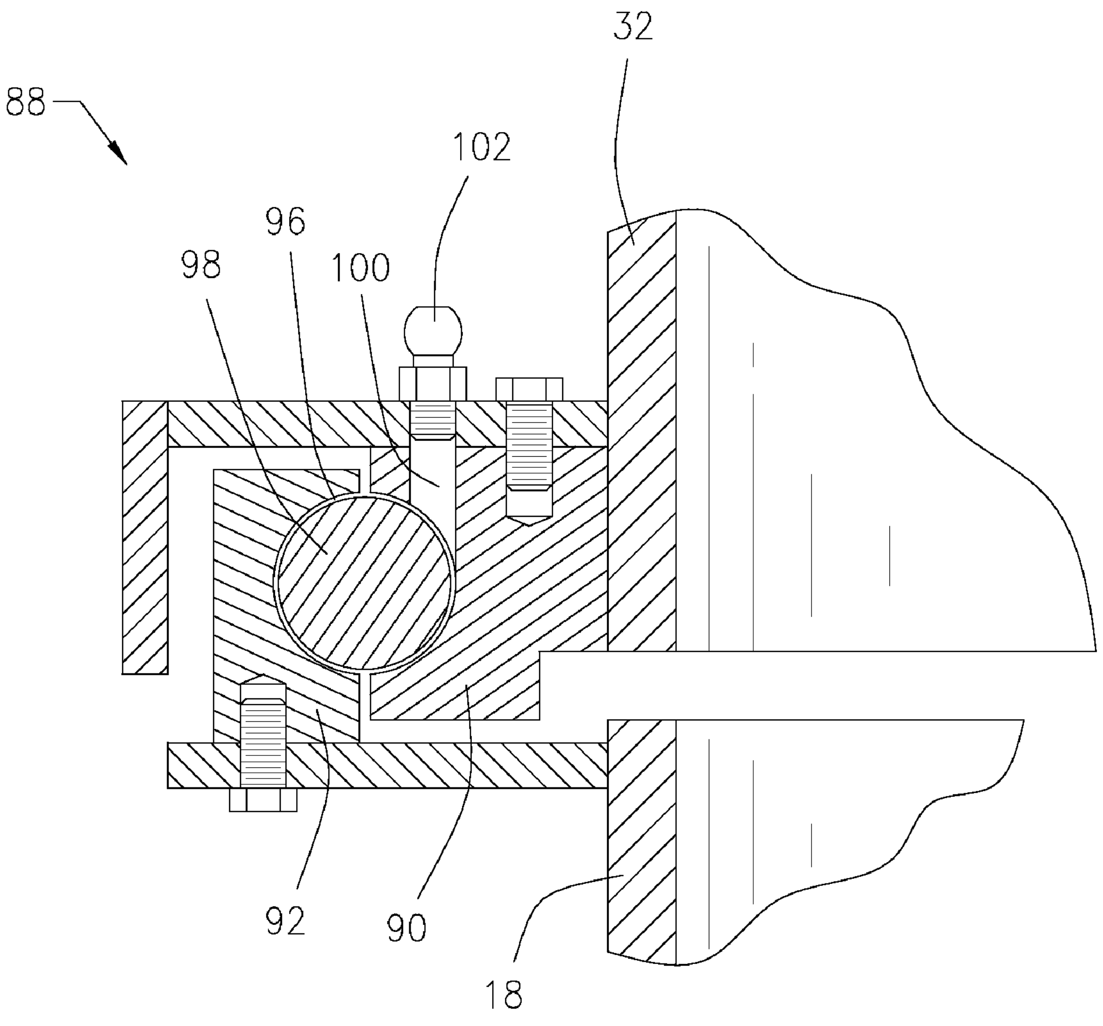
FIG. 17 is a cross-section view along line 16-16 of the funnel-type apparatus removably securable to a concrete chute shown in FIG. 16.

The retainer element 16 is rotatably coupled to the funnel element 18, such as via a bearing assembly 88 enabling the funnel element 18 to rotate 360° with respect to the retainer element 16. This rotation may be locked by the operator to prevent the funnel element 18 from inadvertently rotating during operation. A gasket 30 intermediate of the funnel element 18 and the retainer element 16 forms a seal to prevent concrete 22 from impeding rotation. Referring to FIG. 17, the bearing assembly 88 may include an inner bearing block 90 secured to the lower section 32 of the retainer element 16 and an outer bearing block 92 secured to the funnel element 18. Located within a bearing channel 96 intermediate of the inner bearing block 92 and the outer bearing block 94 is at least one bearing 98 for rotatably coupling the retainer element 16 to the funnel element 18. As shown, the inner bearing block 92 includes at least one grease channel 100 for fluidly connecting the bearing channel 96 to a grease port 102, thereby providing a means for lubricating the bearings 98 within the bearing channel 96. It will be appreciated that the grease channel 100 could be located in other positions, such as within the outer bearing block 92, in keeping with the sprint and scope of the concrete funnel and placement system disclosed herein.

It will be further appreciated that the concrete funnel and placement system illustrated in FIG. 16 is designed for easy transport and will fit in the front of most mixer trucks. Further, the concrete funnel and placement system illustrated in FIG. 16 is designed to be utilized with concrete chutes that have pegs near an end section, whereas the concrete funnel and placement system illustrated in FIG. 2 is designed to be utilized when the end section of the concrete chute of the mixer truck does not have pegs or is old and distorted. Furthermore, the concrete funnel and placement system illustrated in FIG. 2 may be utilized as an extension of the concrete chute of the mixer truck, if needed.

Whereas, the devices and methods have been described in relation to the drawings and claims, it should be understood that other and further modifications, apart from those shown or suggested herein, may be made within the spirit and scope of this invention.

What is claimed is:

1. A concrete funnel and placement system, comprising:

a funnel-type apparatus removably securable to a concrete chute, said funnel-type apparatus comprising a upper retainer element coupled to a lower, substantially annular funnel element about a rotatable, sealed coupling such that said annular funnel element is capable of rotating 360 degrees with respect to the retainer element;

said upper retainer element further comprising:

a substantially annular lower section rotatably coupled to said funnel element via said rotatable, sealed coupling; and a generally U-shaped, upstanding sidewall and a receiving section; a first terminal end and a second terminal end of said upstanding sidewall having a plurality of adjustment holes circumferentially spaced about a horizontal pivot axis between said receiving section hingedly secured to a concrete chute attachment member; said pivot axis allowing said funnel-type apparatus to be adjusted independent of the angle of said concrete chute; and said adjustment holes capable of receipt of an alignment bolt to fix said level and orientation of said funnel-type apparatus once selectively adjusted; said receiving section hingedly secured to said concrete chute attachment member such that the horizontal level and the orientation of the funnel-type apparatus with respect to the ground can be selectively adjusted independent of the angle of the concrete chute to which the funnel-type apparatus is removably secured;

said lower funnel element further comprising a downwardly sloping base having an aperture through which concrete flows to a desired point; and a concrete chute attachment member hingedly connected about a pivot axis to said receiving section of said upper retainer element, said concrete chute attachment member further comprising:

a generally arcuate section for receipt of said concrete flow;

a pair of opposing hooks projecting from an upper terminal end of said concrete chute attachment member for removably attaching said concrete chute attachment member to said concrete chute; and a substantially planar lower terminal end hingedly connected about said pivot axis to said receiving section of said retainer element.

2. The concrete funnel and placement system of claim 1 wherein said retainer element is rotatably coupled to said funnel element via a sealed bearing assembly.

3. The concrete funnel and placement system of claim 2 wherein said bearing assembly comprises an inner bearing block secured to said lower section of said retainer element, an outer bearing block secured to said funnel element, and a plurality of bearings rotatably positioned intermediate of said inner bearing block and said outer bearing block, and wherein said inner bearing block includes at least one grease channel and at least one grease port for providing a means of lubricating said plurality of bearings.

4. The concrete funnel and placement system of claim 2 wherein said bearing assembly comprises said retainer element having a collar with a plurality of bearings rotatably coupled to a lip of said funnel element.

5. The concrete funnel and placement system of claim 2 wherein said bearing assembly comprises a lever lock ring having a plurality of bearings rotatably coupling said retainer element to a lip of said funnel element.

6. The concrete funnel and placement system of claim 1 wherein said funnel-type apparatus includes a gasket intermediate of said retainer element and said funnel element.

7. The concrete funnel and placement system of claim 1 wherein said first terminal end and said second terminal end of said upstanding sidewall each include a primary hinge hole axially aligned along said horizontal pivot axis to adjustably secure said funnel-type apparatus to said concrete chute.

8. The concrete funnel and placement system of claim 1 further comprising a generally arcuate chute adapter removably attachable to said concrete chute attachment member, said chute adaptor comprising a generally arcuate adaptor section for receipt of said concrete flow, a pair of opposing adaptor hooks and opposing adaptor pegs for attachment to said hooks projecting from said upper terminal end of said concrete chute attachment member.

9. The concrete funnel and placement system of claim 1 further comprising at least one interchangeable discharge plate removably securable to said downwardly sloping base of said funnel element for selectively altering the size, pattern, configuration and/or the shape of said aperture of said funnel element.

10. The concrete funnel and placement system of claim 1 wherein the size or the shape of said aperture of said funnel element is selectively adjustable to accurately control the flow of concrete.

11. The concrete funnel and placement system of claim 1 further comprising said funnel element having at least one handle.

12. The concrete funnel and placement system of claim 1 further comprising a remote operating mechanism allowing an operator to rotate or adjust said funnel-type apparatus from a cab of a mixer truck or other location.

13. The concrete funnel and placement system of claim 1 wherein said funnel-type apparatus is constructed of a lightweight, non-reactive polymer, plastic or metal.

14. A concrete funnel and placement system, comprising:

a retainer element comprising a substantially annular lower section, a generally arcuate upstanding sidewall and a receiving section, said upstanding sidewall of said retainer element being generally U-shaped and having a first terminal end and a second terminal end, said first terminal end and said second terminal end of said upstanding sidewall each having a plurality of adjustment holes circumferentially spaced about a hinge hole, and said adjustment holes capable of receipt of an alignment pin to fix the angle of said retainer element with regard to a concrete chute;

a concrete chute attachment member hingedly connected within said receiving section of said retainer element along a hinge connected to said hinge holes in said terminal ends of upstanding sidewall, said concrete chute attachment member comprising a generally arcuate section intermediate of an upstream terminal end and a downstream terminal end for receipt of a flow concrete; said upstream terminal end having a pair of opposing, projecting hooks for removably attaching said concrete chute attachment member to said concrete chute; and said downstream terminal end being hingedly connected via said hinge about said hinge axis to said receiving section of said retainer element;

a substantially annular funnel element comprising a downwardly sloping base having an aperture through a center portion thereof from which concrete flows to a desired point, said funnel element being rotatably coupled to said lower section of said retainer element via a bearing assembly such that said annular funnel element is capable of rotating 360 degrees with respect to the retainer element, and said funnel element having at least one handle;

at least one interchangeable discharge plate having at least one concrete aperture therethrough; said discharge plate removably securable to said downwardly sloping base of said funnel element for selectively altering the size, pattern, configuration and/or the shape of said aperture of said funnel element;

wherein said retainer element is hingedly secured to said concrete chute attachment member such that the horizontal level of the annular funnel element and the axial orientation of the aperture of the annular funnel element with respect to the ground can be selectively adjusted independent of the angle of the concrete chute to which the retainer element is removably secured.

15. The concrete funnel and placement system of claim 14 wherein said bearing assembly comprises an inner bearing block secured to said lower section of said retainer element, an outer bearing block secured to said funnel element, and a plurality of hearings rotatably positioned intermediate of said inner bearing block and said outer bearing block within a bearing channel, and wherein said inner bearing block includes at least one grease channel and at least one grease port for providing a means of lubricating said plurality of bearings.

16. The concrete funnel and placement system of claim 14 wherein said bearing assembly comprises said retainer element having a collar with a plurality of bearings rotatably coupled to a lip of said funnel element.

17. The concrete funnel and placement system of claim 14 wherein said bearing assembly comprises a lever lock ring having a plurality of bearings rotatably coupling said retainer element to a lip of said funnel element.

18. The concrete funnel and placement system of claim 14 further comprising a generally arcuate chute adapter removably attachable to said concrete chute attachment member, said chute adaptor comprising a generally arcuate adaptor section for receipt of said concrete flow, a pair of opposing adaptor hooks and opposing adaptor pegs for attachment to said hooks projecting from said upper terminal end of said concrete chute attachment member.

19. The concrete funnel and placement system of claim 14 wherein said interchangeable discharge plate further comprises at least two clips secured to a bottom of said interchangeable discharge plate.

20. The concrete funnel and placement system of claim 19 wherein said clips are axially aligned and aligned in parallel with two shoulders secured to an opposing side of said of said bottom of said interchangeable discharge plate such that cooperation between said clip and said shoulders retain said downwardly sloping base intermediate of said respective clip and said bottom of said interchangeable discharge plate.

* * * * *